United States Patent
Kimura et al.

(10) Patent No.: US 8,837,088 B1
(45) Date of Patent: Sep. 16, 2014

(54) MICROWAVE-ASSISTED MAGNETIC RECORDING (MAMR) HEAD WITH A CURRENT CONFINEMENT STRUCTURE

(71) Applicant: HGST Netherlands B.V., Amsterdam (NL)

(72) Inventors: Hisashi Kimura, Odawara (JP); Kazuhiko Hosomi, Fujisawa (JP); Kimitoshi Etoh, Odawara (JP); Mikito Sugiyama, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/032,157

(22) Filed: Sep. 19, 2013

(51) Int. Cl.
*G11B 5/127* (2006.01)

(52) U.S. Cl.
USPC ............................................. 360/125.3

(58) Field of Classification Search
CPC .......... G11B 5/147; G11B 5/127; G11B 5/58; G11B 5/584; G11B 20/12; G11B 20/1217
USPC ............ 360/125.3, 125.13, 125.15, 125.03, 360/125.09, 125.04, 125.12, 125.17, 360/125.16, 125.05, 125.38, 125.07, 360/125.08, 125.31, 125.1, 125.11
See application file for complete search history.

(56) References Cited

U.S. PATENT DOCUMENTS

| | | | |
|---|---|---|---|
| 5,377,060 A * | 12/1994 | Nigam | 360/99.01 |
| 5,675,452 A * | 10/1997 | Nigam | 360/99.19 |
| 7,948,716 B2 | 5/2011 | Matono et al. | |
| 8,072,706 B2 | 12/2011 | Hirata et al. | |
| 8,094,399 B2 * | 1/2012 | Roppongi et al. | 360/55 |
| 8,154,825 B2 | 4/2012 | Takashita et al. | |
| 8,201,320 B2 | 6/2012 | Allen et al. | |
| 2011/0134561 A1 * | 6/2011 | Smith et al. | 360/59 |
| 2011/0216447 A1 | 9/2011 | Li et al. | |
| 2012/0140354 A1 | 6/2012 | Takeo et al. | |
| 2012/0147502 A1 | 6/2012 | Udo et al. | |
| 2013/0128388 A1 * | 5/2013 | Ajioka et al. | 360/245.2 |
| 2013/0329316 A1 * | 12/2013 | Watanabe et al. | 360/78.04 |

FOREIGN PATENT DOCUMENTS

JP  2012-014792  1/2012

OTHER PUBLICATIONS

Igarashi et al., "Oscillation Feature of Planar Spin-Torque Oscillator for Microwave-Assisted Magnetic Recording," 2010 IEEE, IEEE Transactions on Magnetics, vol. 46, No. 10, Oct. 2010, pp. 3738-3741.

* cited by examiner

*Primary Examiner* — Allen T Cao
(74) *Attorney, Agent, or Firm* — Zilka-Kotab, PC

(57) ABSTRACT

In one embodiment, a magnetic head includes a main pole configured to emit a recording magnetic field for affecting a magnetic medium, the main pole serving as a first electrode and having a front portion at an air bearing surface (ABS) of the magnetic head and a rear portion extending from the front portion in an element height direction perpendicular to the ABS, wherein an upper surface of the main pole has a step transitioning from the front portion to the rear portion, a conductive layer positioned above the main pole, the conductive layer serving as a second electrode, a microwave oscillator positioned between the main pole and the conductive layer at the ABS of the Magnetic head and extending beyond the step in the element height direction, and a current confinement layer positioned between the microwave oscillator and the rear portion of the main pole.

20 Claims, 13 Drawing Sheets

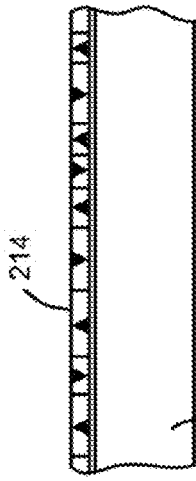
FIG. 2A
FIG. 2B
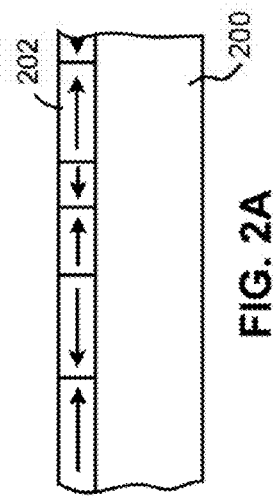
FIG. 2C
FIG. 2D
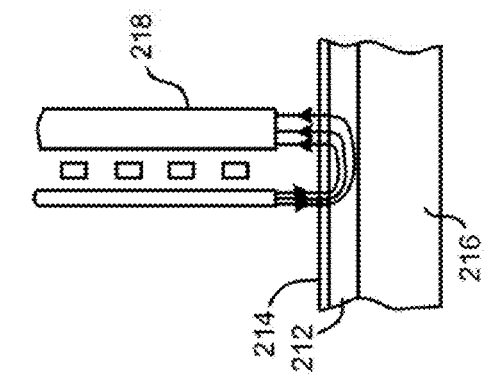
FIG. 2E
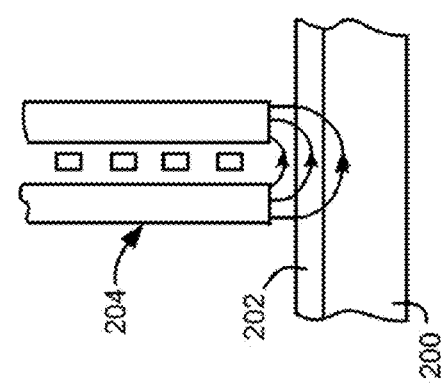

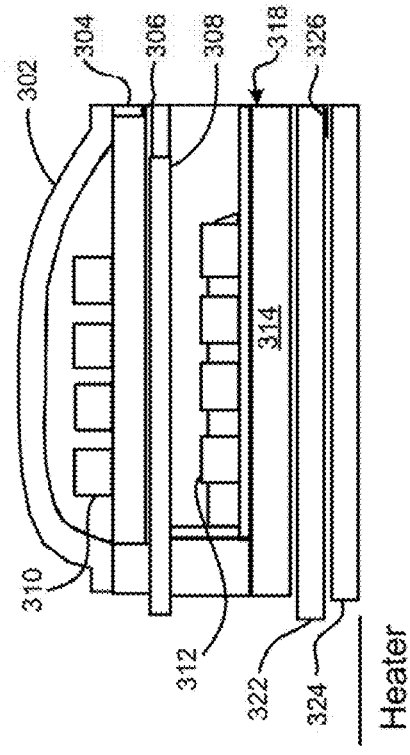
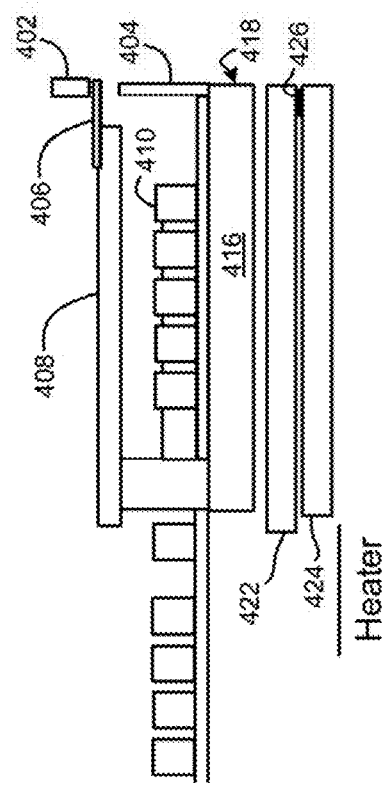
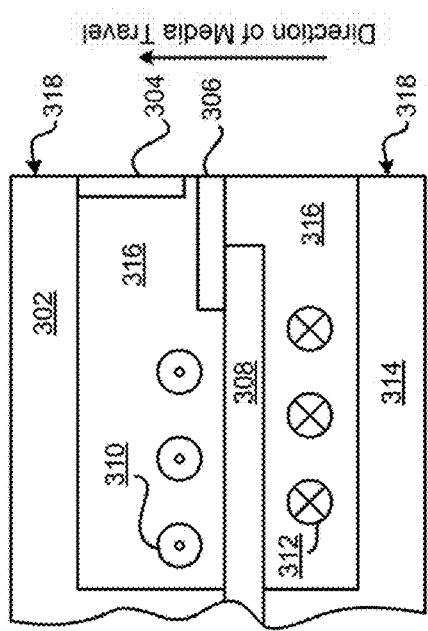
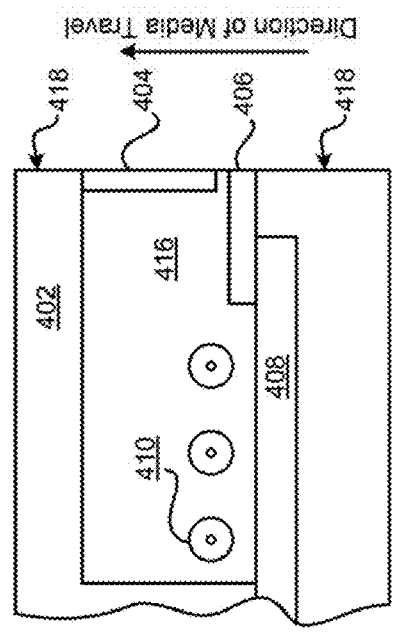

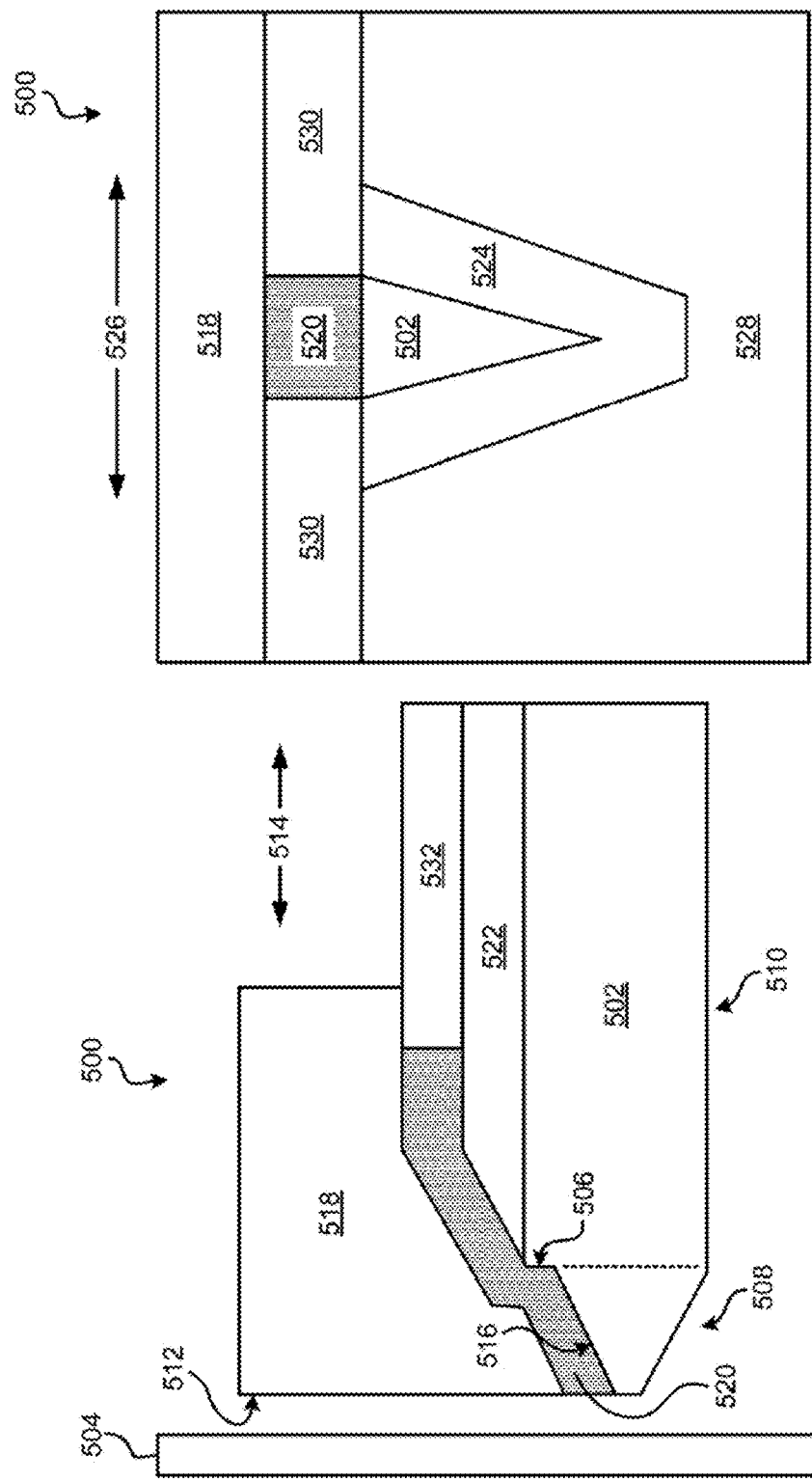

MICROWAVE-ASSISTED MAGNETIC RECORDING (MAMR) HEAD WITH A CURRENT CONFINEMENT STRUCTURE

FIELD OF THE INVENTION

The present invention relates to a microwave assisted magnetic recording (MAMR) head capable of inducing magnetization reversal by application of a high-frequency magnetic field to a magnetic medium, and specifically to a MAMR head having a main pole with a stepped structure.

BACKGROUND rize the structure. It should be noted that the region to the left of Aally includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating, but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles. In order to produce a higher recording density in a magnetic head installed in a hard disk device, the track pitch may be narrowed and bits for writing to the magnetic medium may be made smaller. As a result, there is a considerable reduction in the area of the main pole at the air bearing surface (ABS). As the main pole in a conventional magnetic head becomes narrower, the recording field decreases, and it is no longer possible to produce the recording field required for writing.

In order to deal with this problem, a method of recording known as high-frequency magnetic field assisted recording or Microwave Assisted Magnetic Recording (MAMR) in which a microwave oscillator, such as a Spin Torque Oscillator (STO) is formed above the magnetic pole, a high-frequency-magnetic field is applied to the magnetic medium in order to reduce the coercive force of the medium, and recording is performed in this state by applying a recording field to the medium. Methods for forming, the STO on a flat main pole have been proposed. However, when the main pole is flat, the head field generated by the main pole is reduced in comparison with a main pole having a conventional shape which is tapered at the trailing side. This means that in order to subsequently increase the recording density, it may be necessary to form the microwave oscillator on the taper which is provided on the trailing side of the main pole in order to alleviate the reduction in the head field.

However, implementing a high assist effect from the microwave magnetic field in order to use MAMR is not sufficient to achieve a high recording density. If the magnetic characteristics of the medium are not appropriately controlled to correspond to the magnetic field of the head, satisfactory recording characteristics will not be obtained even if a high assist effect is obtained.

SUMMARY

In one embodiment, a magnetic head includes a main pole configured to emit a recording magnetic field for affecting a magnetic medium, the main pole serving as a first electrode and having a front portion at an air bearing surface (ABS) of the magnetic head and a rear portion extending from the front portion in an element height direction perpendicular to the ABS, wherein an upper surface of the main pole has a step transitioning from the front portion to the rear portion, a conductive layer positioned above the main pole, the conductive layer serving as a second electrode, a microwave oscillator positioned between the main pole and the conductive layer at the ABS of the magnetic head and extending beyond the step in the element height direction, and a current confinement layer positioned between the microwave oscillator and the rear portion of the main pole.

In another embodiment a method for forming a magnetic head includes forming a main pole configured to emit a recording magnetic field for affecting a magnetic medium, the main pole having a front portion at an ABS of the magnetic head and a rear portion extending from the front portion in an element height direction perpendicular to the ABS, forming a step in an upper surface of the main pole, the step transitioning from the front portion of the main pole to the rear portion of the main pole, forming a current confinement layer above the rear portion of the main pole, forming a microwave oscillator above the front portion of the main pole at the ABS of the magnetic head and above the current confinement layer, the microwave oscillator extending beyond the step of the main pole in the element height direction, and forming a conductive layer above the microwave oscillator, the conductive layer serving as a trailing shield.

Any of these embodiments may be implemented in a magnetic data storage system such as a disk drive system, which may include a magnetic head, a drive mechanism for passing a magnetic storage medium (e.g., hard disk) over the head, and it control unit electrically coupled to the head for co rolling operation of the head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a magnetic medium utilizing a longitudinal recording format.

FIG. 2B is a schematic representation of a conventional magnetic recording head and magnetic medium combination for longitudinal recording as in FIG. 2A.

FIG. 2C is a magnetic medium utilizing a perpendicular recording, format.

FIG. 2D is a schematic representation of a recording head and magnetic, medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

FIGS. 5A-5B show schematic views of a microwave assisted magnetic recording (MAMR) head according to one embodiment.

DETAILED DESCRIPTION

Figure 1:
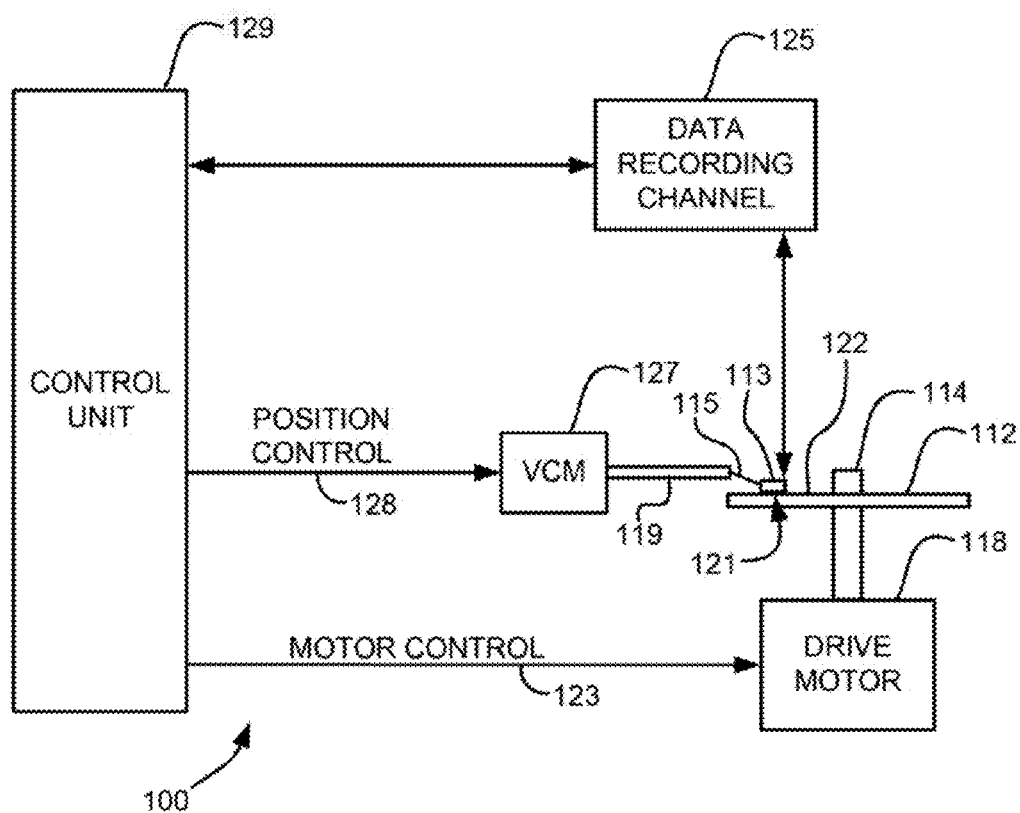
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In order to provide a magnetic head which is capable of reading and writing to a magnetic medium with a narrower track pitch, a microwave oscillator may be formed on a taper of a main pole of the magnetic head. However, when this is done, a height direction of a microwave oscillator, e.g., a spin torque oscillator (STO), needs to be patterned with great precision, and the pattern in the height direction must also match (be aligned with) the main pole formed directly below the microwave oscillator. Therefore, it is difficult to form a microwave oscillator at the tapered portion while maintaining a good yield. If the height position of the microwave oscillator and the height position of the main pole are misaligned, the head field produced by the main pole increases and decreases when the microwave oscillator is at certain heights which affects the write width on the medium. As a result, it is difficult to achieve necessary write characteristics and recording track width.

A method of producing a magnetic head with a microwave oscillator which does not present these issues, e.g., a method which uses a head structure which provides a good yield of magnetic recording heads which enable stable high-frequency magnetic field assisted recording, is presented herein according to various approaches. Furthermore, magnetic heads and magnetic recording devices employing the same are also described according to various embodiments. Specifically, in one embodiment, a structure for high-frequency magnetic field-assisted recording is provided in which the alignment precision of the main pole and the microwave oscillator is unlikely to be affected by the formation process.

In one general embodiment, a magnetic head includes a main pole configured to emit a recording magnetic field for affecting a magnetic medium, the main pole serving as a first electrode and having a front portion at an air bearing surface (ABS) of the magnetic head and a rear portion extending from the front portion in an element height direction perpendicular to the ABS, wherein an upper surface of the main pole has a step transitioning from the front portion to the rear portion, a conductive layer positioned above the main pole, the conductive layer serving as a second electrode, a microwave oscillator positioned between the main pole and the conductive layer at the ABS of the magnetic head and extending beyond the step in the element height direction, and a current confinement layer positioned between the microwave oscillator and the rear portion of the main pole.

In another general embodiment, a method for forming, a magnetic head includes forming a main pole configured to emit a recording, magnetic field for affecting, a magnetic medium, the main pole having, a front portion at an ABS of the magnetic head and a rear portion extending from the front portion in an element height direction perpendicular to the ABS, forming a step in an upper surface of the main pole, the step transitioning from the front portion of the main pole to the rear portion of the main pole, forming, a current confinement layer above the rear portion of the main pole, forming a microwave oscillator above the front portion of the main pole at the ABS of the magnetic head and above the current confinement layer, the microwave oscillator extending beyond the step of the main pole in the element height direction, and forming a conductive layer above the microwave oscillator, the conductive layer serving as a trailing shield.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according, to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1, may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift, an the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, controller 129 comprises logic control circuits, storage (e.g., memory), and a microprocessor. In a preferred approach, the controller 129 is electrically coupled (e.g., via wire, cable, line, etc.) to the one or more magnetic read/write portions 121, for controlling operation thereof. The controller 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and is yoke portion which extends from the flare point to the back gap. The flare point is where the second pole piece begins to widen (flare) to form the yoke. The placement of the flare point directly affects the magnitude of the magnetic field produced to write information on the magnetic medium.

As would be understood by one of skill in the art, a magnetic storage device 100 may include some or all of the following elements: at least one magnetic, head 121, a magnetic medium 112, a drive mechanism 118 for passing the magnetic medium 112 over the at least one magnetic head 121, and a controller 129 electrically coupled to the at least one magnetic head 121 for controlling operation of the at least one magnetic head 121.

FIG. 2A illustrates, schematically, a conventional magnetic medium such as used with magnetic disc recording systems, such as that shown in FIG. 1. This medium is utilized for recording magnetic impulses in or parallel to the plane of the medium itself. The magnetic medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional magnetic medium, such as that of FIG. 2A.

FIG. 2C illustrates, schematically, the orientation of magnetic impulses substantially perpendicular to the surface of a magnetic medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a magnetic medium. The magnetic medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer not shown) called an "exchange-break" layer or "interlayer" between layers 212 and 214.

In this structure, the magnetic lines of flux extending between the poles of the perpendicular head 218 loop into and out of the overlying coating 214 of the magnetic medium with the high permeability under layer 212 of the magnetic medium (soft under layer) causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the under layer 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole (shield) 314 first, then past the stitch pole 308, main pole 306, trailing shield 304 which may be connected to the wrap around shield (not shown), and finally past the upper return pole 302. Each of these components may have a portion contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having, similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Except as otherwise described herein, the various components of the structures of FIGS. 3A-4B may be of conventional materials and design, as would be understood by one skilled in the art.

Now referring to FIGS. 5A-5B, a magnetic head 500 is shown according to one embodiment. The magnetic head 500 comprises a main pole 502 adapted for emitting a recording magnetic field for affecting, a magnetic medium 504. The main pole 502 serves as a first electrode and has a front portion 508 at an ABS 512 of the magnetic head 500 and a rear portion 510 extending, from the front portion 508 in an element height direction 514 perpendicular to the ABS 512. An upper surface 516 of the main pole 502 has a step 506 transitioning from the front portion 508 to the rear portion 510. This step 506 causes the main pole 502 to have a stepped structure in which an upper surface of the front portion 508 is lower than an upper surface of the rear portion 510. The magnetic head 500 also includes a conductive layer 518 positioned above the main pole 502, the conductive layer 518 serving as a second electrode, a microwave oscillator 520 positioned between the main pole 502 and the conductive layer 518 at the ABS 512 of the magnetic head 500 and extending beyond the step 506 in the element height direction 514, and a current confinement layer 522 positioned between the microwave oscillator 520 and the rear portion 510 of the main pole 502.

According to one embodiment, the conductive layer 518 may be a trailing shield and may provide shielding for writing to the magnetic medium 504, as would be understood by one of skill in the art, in addition, in one approach, the magnetic head 500 may also comprise an insulation layer 532 positioned at a rear side of the microwave oscillator 520 and above the current confinement layer 522.

According to one approach, the rear portion 510 of the main pole 502 at the step 506 is thicker than the front portion 508 of the main pole 502 at the step 506. The step 506 is an abrupt vertical change in the upper surface of the main pole 502, which may be at least 2 nm in thickness, in some embodiments. In some embodiments, the step 506 may be between about 1 and about 3 nm in height, and in other embodiments, the step 506 may be between about 2 nm about 5 nm in thickness.

The microwave oscillator 520 is configured to generate a high-frequency magnetic field which is superimposed with the recording magnetic field in order to record data to the magnetic medium 504 when current flows to the microwave oscillator 520, which is positioned between the first electrode (main pole 502) and the second electrode (conductive layer 518). The microwave oscillator 520 may be a STO or some other suitable oscillator device or layer capable of producing a high-frequency magnetic field to aid in magnetic data recording on the magnetic medium 504.

In one approach, the current confinement layer 522 may be configured to control a current density distribution of current flowing to the microwave oscillator 520. The current confinement layer 522 may comprise a nonmagnetic insulating material, according to one embodiment, such as alumina, MgO, etc. In this way, the current provided to the microwave oscillator 520 may be shaped or manipulated to produce a desired effect from the microwave oscillator 520 and further control the writing of data to the magnetic medium 504. In one embodiment, the current confinement layer 522 may be positioned such that it is not positioned between the microwave oscillator 520 and the front portion 508 of the main pole 502, as shown in FIG. 5A. Of course, in other embodiments, a portion of the current confinement layer 522 may be positioned between these layers, or some other layer or material may be positioned between the front portion 508 of the main pole 502 and the microwave oscillator 520 at the ABS 512.

According to one embodiment, as shown in FIG. 5A, the front portion 508 of the main pole 502 may be tapered such that the front portion 508 is thinner at the ABS 512 than at the step 506. That is to say, the front portion 508 of the main pole 502 may gradually increase in thickness (in a direction parallel to the ABS 512) away from the ABS 512 in the element height direction 514.

In accordance with another embodiment, a lower surface of the microwave oscillator 520 that contacts the upper surface 516 of the front end 508 of the main pole 502 may be inclined with respect to the element height direction 514. As shown in FIG. 5A, the upper and lower surfaces of the microwave oscillator 520 are not parallel to the element height direction 514; instead, they are slanted in an inclined orientation with respect to the element height direction 514. In an additional embodiment, an upper surface of the current confinement layer 522 may be inclined with respect to the element height direction 514, with an amount of inclination of the current confinement layer 522 being essentially the same as an amount of inclination of the lower surface of the microwave oscillator 520, e.g., the upper surface of the current confinement layer 522 may be parallel with the lower surface of the microwave oscillator 520, either above the front portion 508 of the main pole 502 and/or above the current confinement layer 522.

According to another embodiment, a lower surface of the microwave oscillator 520 may have a step positioned at the step 506 of the main pole 502 (and corresponding thereto). Furthermore, an upper surface of the microwave oscillator 520 may have a step (also corresponding to the step 506 of the maw pole 502) positioned closer to the ABS 512 than the step of the lower surface of the microwave oscillator 520. That is to say, the step 506 of the main pole 502 may cause the microwave oscillator 520 to have corresponding steps in upper and lower surfaces thereof.

FIG. 5B shows the magnetic head 500 from the ABS. As this view shows, the microwave oscillator 520, the main pole 502, a side gap 524 on sides of the main pole 502 in a cross-track direction 526, a trailing gap 530, the conductive layer 518 (trailing shield), and a leading edge shield (LES) 528 are positioned at the ABS of the magnetic head 500, in one embodiment.

Figure 6:
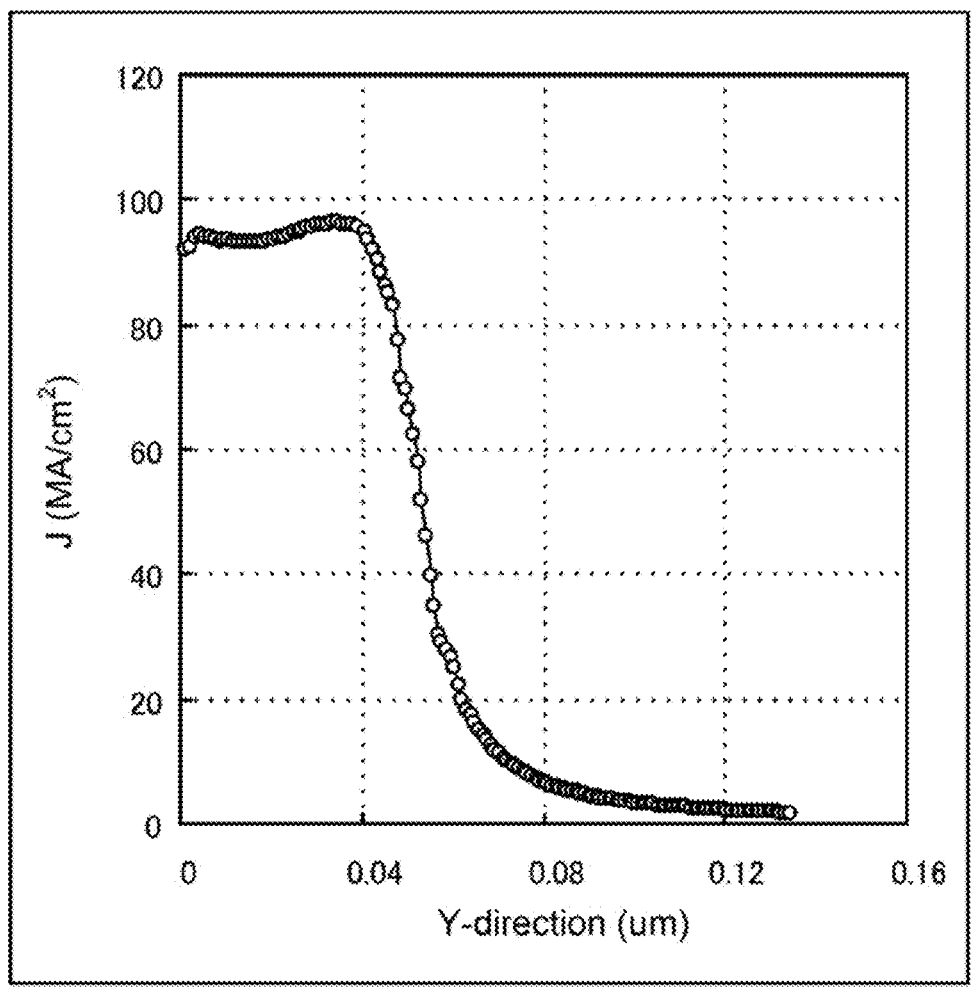
FIG. 6 shows the current density distribution within an oscillator of a magnetic head according to one embodiment.

FIG. 6 shows the density distribution of the current flowing to a STO (used as the microwave oscillator) when a voltage is applied between the main pole and the trailing shield of a recording head according, to the present invention. The voltage applied between the main pole and the trailing shield (conductive layer) causes current to flow to the microwave oscillator, but the current is able to flow in a concentrated manner to a portion of the microwave oscillator in contact with a tapered portion of the main pole (front portion) because of the current confinement layer which may comprise a nonmagnetic insulating material as a film directly or indirectly on the main pole.

It is clear horn FIG. 6 that a relatively uniform current density is produced at the height position from the ABS to the end of the current confinement layer (about 0 to 0.04 μm), while the current density drops sharply from the position of the current confinement layer. This structure therefore clearly enables current to flow in a concentrated manner only to the microwave oscillator in one portion.

Figure 7:
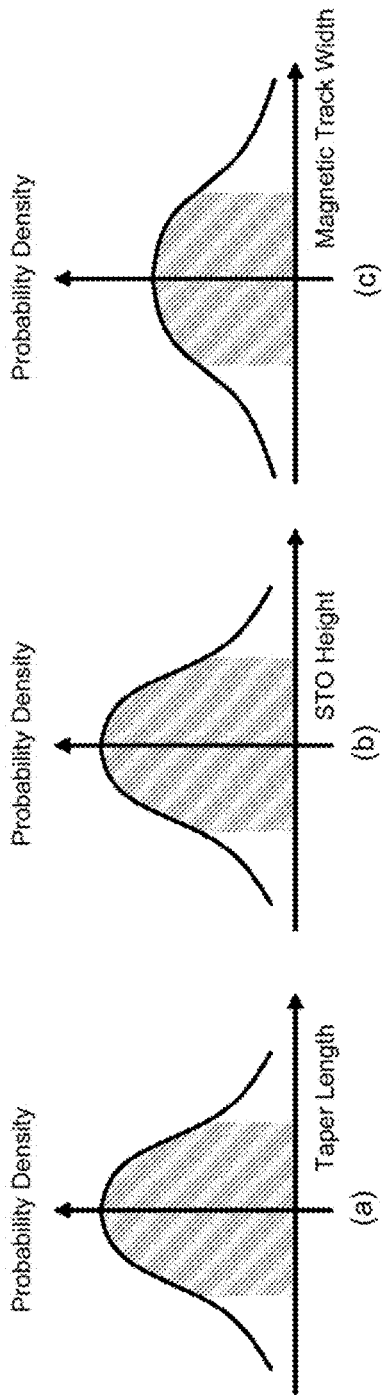
FIG. 7 shows the probability density distribution for dimensions in a conventional MAMR structure.

FIG. 7 schematically shows variations in the length of the tapered portion on the upper surface of the main pole having a conventional structure. FIG. 7 also schematically shows variations in height of an oscillator having a conventional structure. The vertical axis shows the probability density distribution, while the horizontal axis shows (a) the main pole taper length, (b) the height of the oscillator, and (c) the magnetic track width. The main pole taper length and the height of the oscillator each have their own independent variations, so if the same dimensions are independently obtained for each, the effect of these two parameters on the magnetic track width is determined by convolution of the main pole taper length and the height of the oscillator, as a result there is greater variation in the magnetic track width and the head yield is likely to be reduced, as shown in (c).

Figure 8:
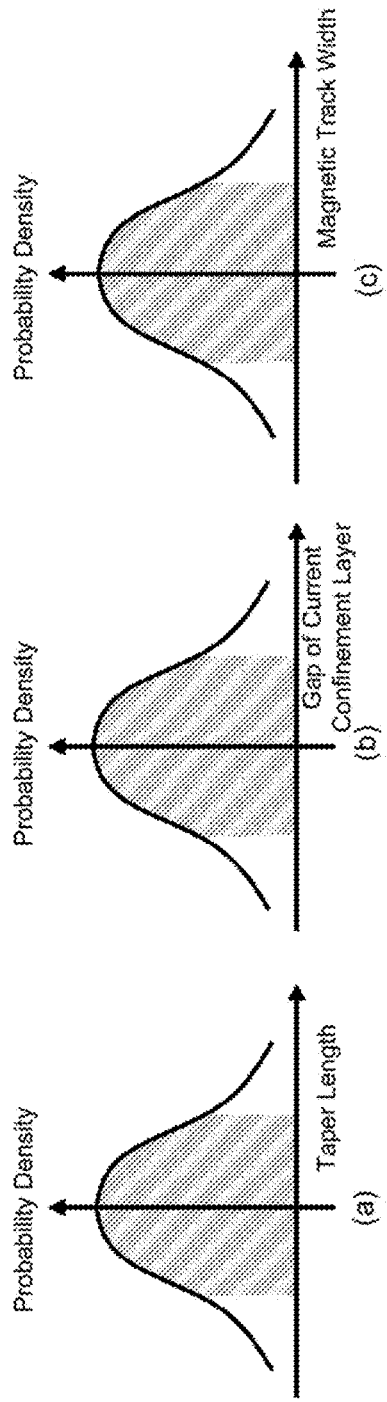
FIG. 8 shows the probability density distribution for dimensions in a MAMR structure according to one embodiment.

FIG. 8 schematically shows variations in the taper length on the upper portion of the main pole according to embodiments disclosed herein. The vertical axis shows the probability density distribution, while the horizontal axis shows (a) the main pole taper length, (b) the gap to the current confinement layer (the effective height of the microwave oscillator), and (c) the magnetic track width. The main pole taper length and the gap to the current confinement layer of the microwave oscillator are determined by the difference in level on the trailing side of the pole, and are determined, by the same formation process, so the correlation coefficient is believed to be 1. In other words, a defective head having a large gap to the current confinement layer is also defective with a large main pole taper length. This means that the effect of these two parameters on the magnetic track width may be considered as the distribution of one parameter, and as a result, variations in the magnetic recording track width do not change, as shown in (c), and it is possible to achieve a high head yield as a result.

Accordingly, in one embodiment, by providing a difference in level on the tapered portion of the main pole in the process of forming the main pole taper, it is possible to determine the microwave oscillator height at the same time, so variations in the magnetic track width may be reduced. This means that it is possible to achieve a high magnetic head yield using this formation process.

It should be noted that in the microwave assisted magnetic head provided with a current confinement layer according to embodiments described herein may not only be applied to the simple structure of the microwave oscillator and main pole for generating, a recording, field, and the trailing shield, but also optionally to a side shield, leading edge taper and/or the like, which are used in perpendicular recording. In this case, the area between the main pole and the trailing shield may have a structure in which electrical short circuiting is prevented, in the region outside the microwave oscillator (e.g., the back gap), or a structure which is capable of supplying adequate current to the microwave oscillator even if there is a short circuit.

Figure 9A:
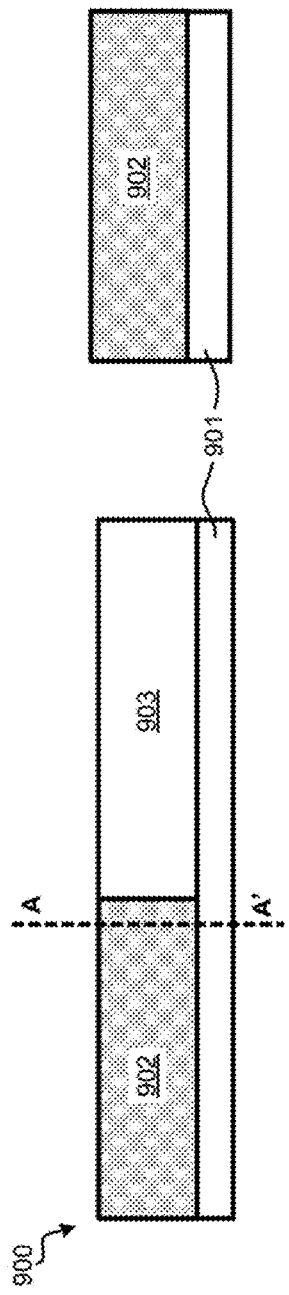
FIGS. 9A-9L show steps in a method for producing a MAMR magnetic head according to one embodiment.
Figure 9B:
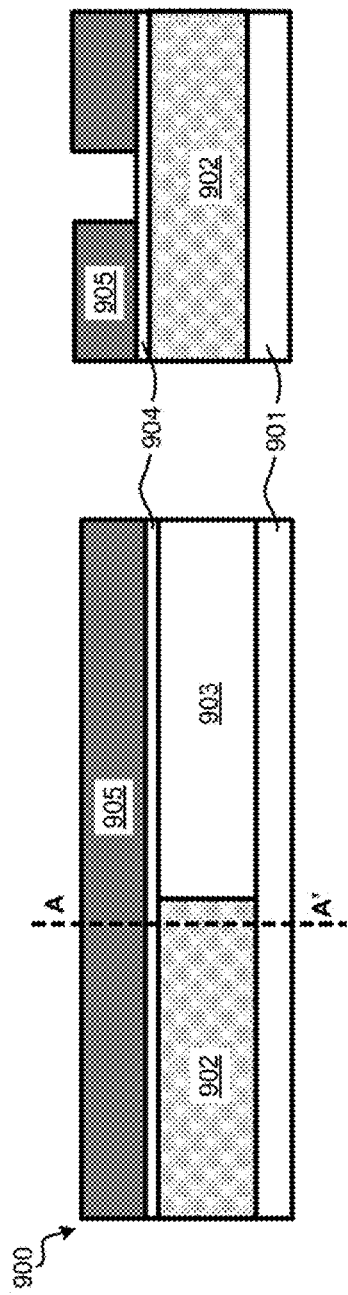

FIGS. 9A-9B show cross-sectional views of one example of a method for producing an MAMR head in accordance with one embodiment. The left-hand side in the Figures is a cross-sectional view at the center of the MAMR head, and the right-hand side shows a view from the ABS.

FIG. 9A shows the shape of the structure 900 after an underlayer is plated over the whole surface of a substrate 901. The substrate 901 may comprise alumina for separating a reproduction head and a recording section, which may be formed on the surface of the substrate 901 as well. Above the substrate 901, an Leading Edge Shield (LES) 902 is formed which is a shield on the leading side of the main pole, an insulating film 903 is then formed which may comprise $Al_2O_3$ or some other suitable material known in the art, and Chemical Mechanical Polishing (CMP) or some other suitable technique known in the art is performed in order to planarize the structure. It should be noted that the region to the left of A-A' in the left-hand side of the Figures is removed in a subsequent process after a wafer process (A-A' is the ABS).

FIG. 9B shows the structure 900 when a multilayer film 904 constituting a hard mask layer for a subsequent reactive ion etching (RIE) process and a CMP stopper layer have been formed, after which patterning is performed using a resist pattern 905 as a mask in order to obtain the desired planar shape. Here, an alloy film comprising Ni, Cr, etc., may be used on top as an RIE stopper, and a diamond-like carbon (DLC), Ta film, or the like, may be used for the lower layer as a CMP stopper.

Figure 9C:
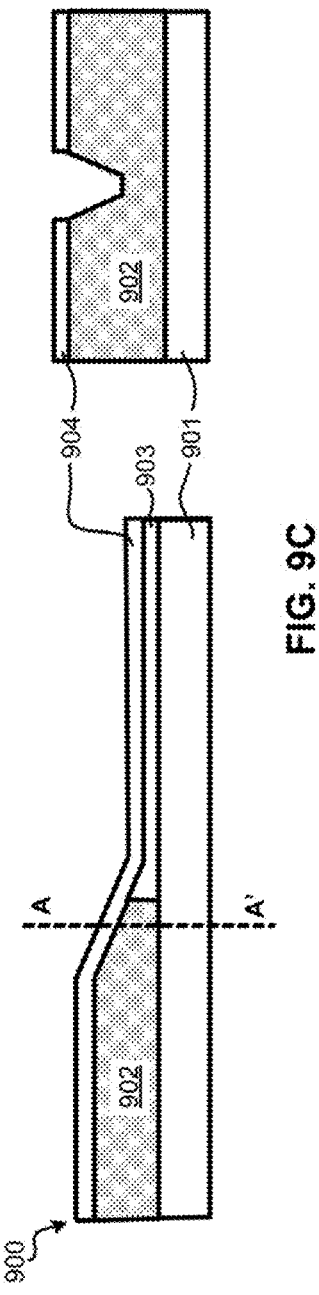

FIG. 9C shows the structure 900 when the multilayer film 904 has been etched using the resist pattern 905 as a mask layer and the LES 902 has been etched via RIE using the multilayer film 904 as a mask. Of course, other techniques may be used to obtain the desired shape of the structure 900 as would be known to one of skill in the art. In this example, Ar ion milling may be used in order to etch the multilayer film 904, but the lower side of the multilayer film may be etched using RIE employing $CF_4$, $CHF_3$, etc., when the non-etching material is Ta. Furthermore, when the non-etching material is DLC, RIE may be performed using $O_2$, $CO_2$, etc. Furthermore, RILE involving methanol, ammonia, etc., may be used for etching the LES 902 employing the multilayer film 904 as a mask.

Figure 9D:
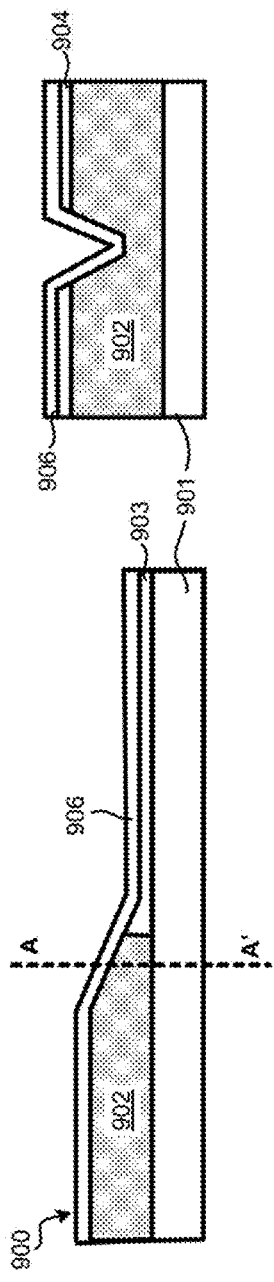

FIG. 9D shows the structure 900 when a nonmagnetic film 906 comprising a magnetic separation layer for the main pole and the side shield layer is formed in a trench formed in the previous process. In this example, the thickness of the nonmagnetic film 906 may be selected to be about 0.5 to about 2.0 times a width of the magnetic pole. The nonmagnetic film 906 may be a nonmagnetic insulating film, such as $Al_2O_3$ or the like, or a nonmagnetic metal film, such as Ru.

Figure 9E:
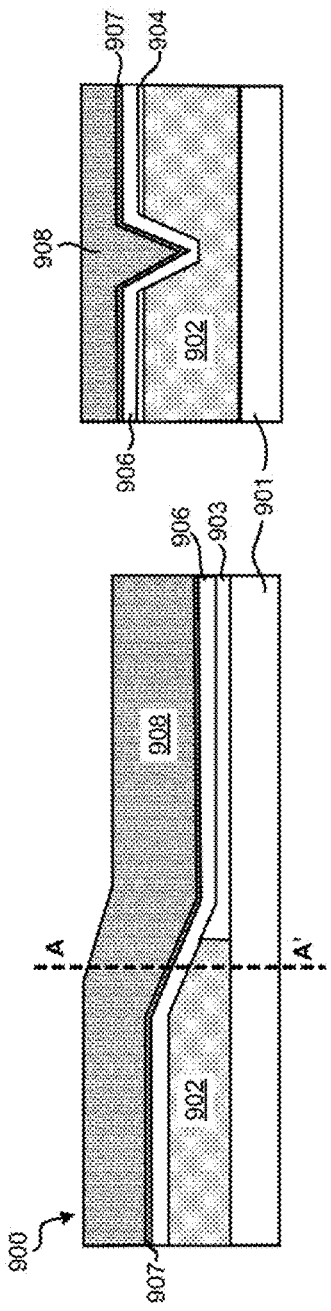

FIG. 9E shows the structure 900 when a plating underlayer 907 is formed in the trench, and a plated layer 908 comprising the main pole is formed thereon. In this example, the plated layer may be grown by plating over the whole surface of the plating underlayer, or a resist pattern may be formed on the plating underlayer after which the plated layer may be partially grown. Furthermore, the plated layer comprising the main pole and the plating underlayer may employ a material which produces a high saturation magnetic flux density in order to achieve high recording performance, such as CoN-iFe, CoFe, FeNi, or the like.

Figure 9F:
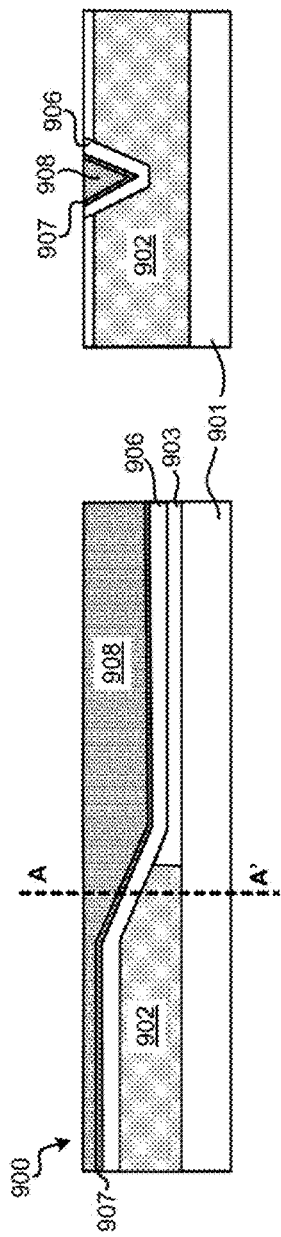

FIG. 9F shows the structure 900 when the main pole 908 has been planarized by via CMP or the like using the multilayer film 904 as a stopper layer. As shown in FIG. 9F, the plated layer on the multilayer film 904 is removed.

Figure 9G:
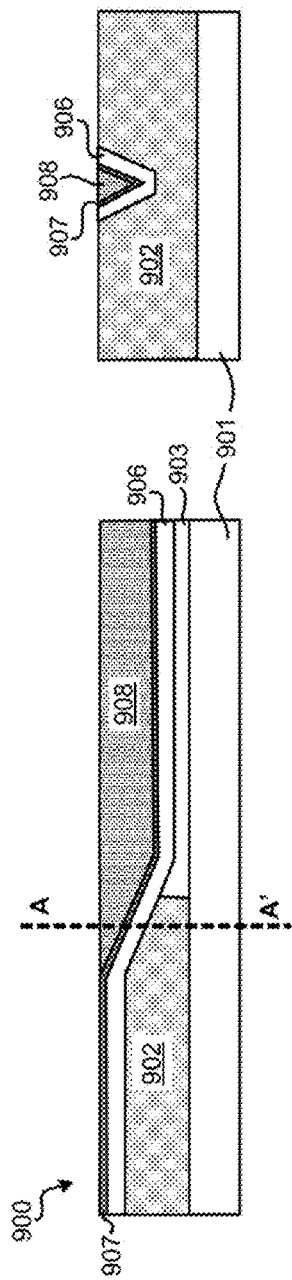

FIG. 9G shows the structure 900 when the main pole has been etched, such as by using Ar ion milling, in order to form the main pole 908 to the desired dimensions after planarization. In this example, the multilayer film 904 may also be etched and removed at the same time that the main pole 908 is etched. In addition, the LES 902 may also be etched to essentially or about the same height as the main pole 908, or a height close to the height of the main pole 908. However, when DLC or the like is used in the multilayer film 904, Ar ion milling may be performed after the DLC has been removed in advance, such as via $O_2$ ashing or the like.

Figure 9H:
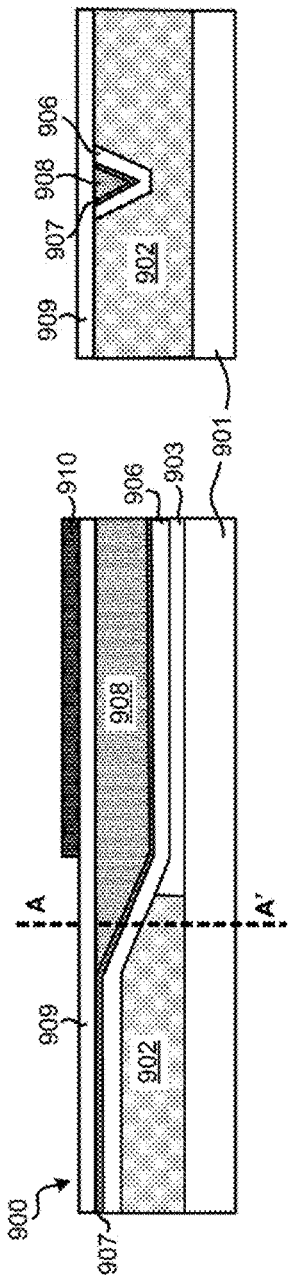

FIG. 9H shows the structure 900 when a nonmagnetic film 909 is formed in order to maintain the magnetic distance between the planarized portion of the main pole and the trailing shield, and a resist pattern 910 is formed in order to taper the tip-end section at the trailing side of the magnetic pole 908. In some approaches, the nonmagnetic film 909 may be electrically conductive. However, according to preferred embodiments, the nonmagnetic film 909 may be an insulating film, e.g., of $Al_2O_3$, $SiO_2$, or other known insulative, nonmagnetic material. By forming the nonmagnetic film 909 of an insulator, current is able to flow to a microwave oscillator 911 only through the main electrode (magnetic pole) 908, without the current flowing to the microwave oscillator 911 through the insulative nonmagnetic film 909. Thus, the nonmagnetic insulating, film 909 may function as a current confinement layer, and is described interchangeably therewith in reference to film 909. More detail about the various permutations of film 909 is provided below.

Figure 9I:
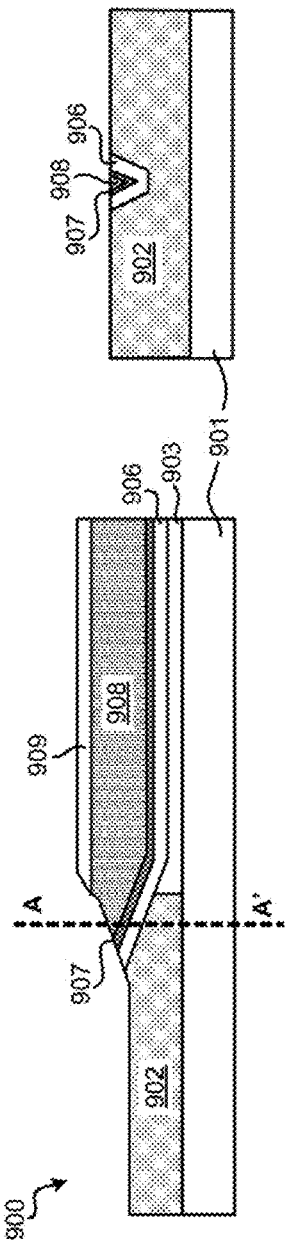

FIG. 9I shows the structure 900 when the main pole 908 is tapered using Ar ion milling or the like, using the resist pattern 910 as a mask. In this example, the process may be set in such a way that a difference in level of at least about 2 nm is provided at the boundary of the main pole 908 and the nonmagnetic film (current confinement layer) 909 at the step. The difference in level may be produced using $Al_2O_3$, which has high resistance to Ar ion milling, as the nonmagnetic film 909, or some other suitable material. Furthermore, according to a different method, the main pole 908 and nonmagnetic film 909 may be directly tapered, after which a minute difference in level may be formed by selecting the angle of incidence of the Ar ion milling.

Figure 9J:
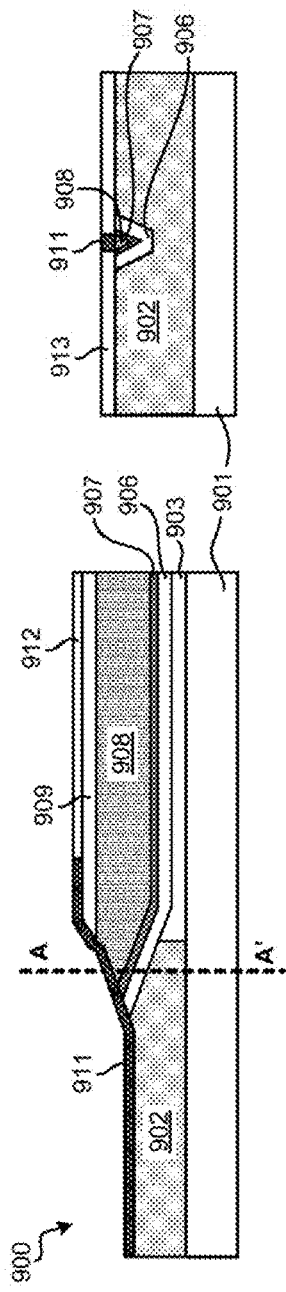

FIG. 9J shows the structure 900 when the oscillator 911 has been formed on the taper of the main pole 908. In this example, the oscillator 911 is formed in such a way as to run over the difference in level (step) formed on the main pole 908 and the oscillator 911 is also formed with a difference in level (step). After the oscillator 911 has been formed it is then subjected to processing in the track width direction in the same way as the process for a normal magnetic head, and then height direction processing is carried out. The height direction processing, according to this exemplary embodiment, may comprise processing such that a position on the oscillator 911 which is deeper in the height direction than the position at the difference in level (step) forms an end portion, and there is no need for high-precision positional-matching, (alignment) with the height of the main pole 908. An insulating film 913 may then be provided on both sides in the track width direction, and an insulating, film 912 may be provided at the rear end in the height direction. In this example, alumina may be employed for both the insulating, film 912 and the insulating film 913. According to this exemplary embodiment, current flowing to the oscillator 911 is regulated by the taper length of the main pole 908, and therefore there is no need for patterning in the height direction in the region of the ABS, and as a result there is increased redundancy with respect to patterning in the height direction.

Figure 9K:
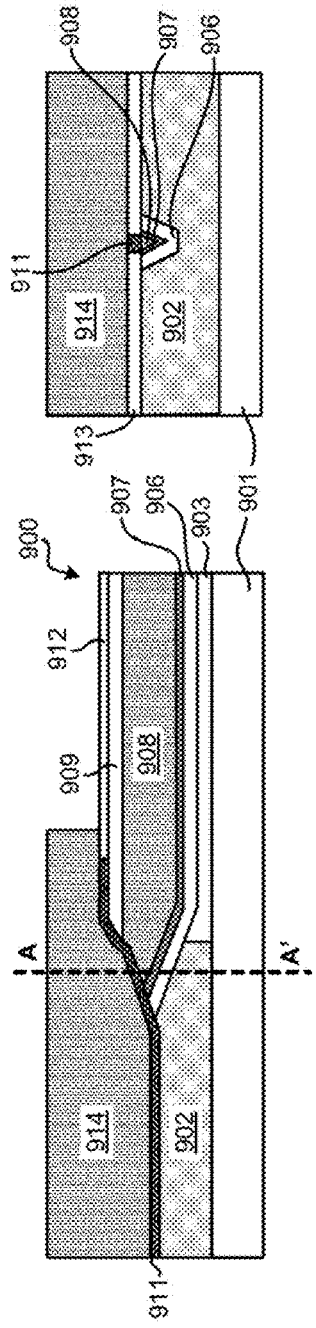

FIG. 9K shows the structure 900 when a magnetic film 914 constituting the trailing shield is formed on the microwave oscillator 911. In this example, the shape of the trailing shield 914 may be formed by forming a plating, underlayer over the whole surface, forming, a resist frame in a photolithography process, and forming a plating film. In addition, the shape may be formed by removing the plating underlayer, such as by using Ar ion milling. In this example, when the microwave oscillator 911 is energized with current, a voltage is applied between the main pole and the trailing shield, and as a result the current produces energizing without splitting at the portion where the microwave oscillator 911 lies over the nonmagnetic layer 909.

Figure 9L:
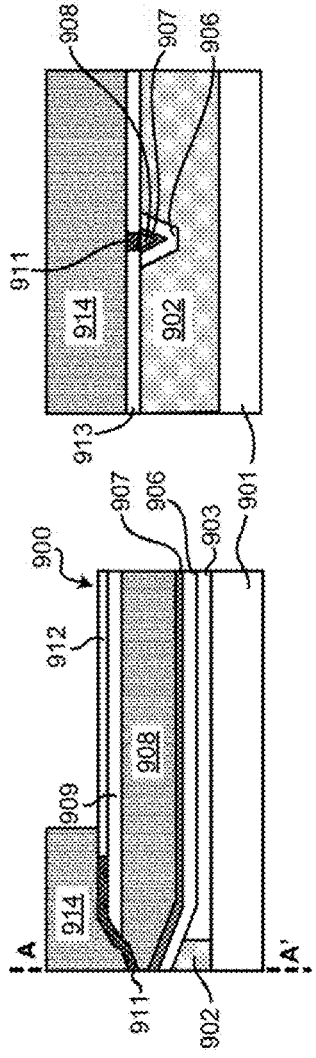

FIG. 9L shows the final shape of the structure 900. In this example, an upper pole is electrically connected to the trailing shield 914 and a sub-pole or the like is electrically connected to the main pole 908. In addition, a coil or the like for inducing magnetic flux is formed on the upper shield or the sub-pole, etc., but the method of formation thereof is not described as it is known in the art.

Figure 10:
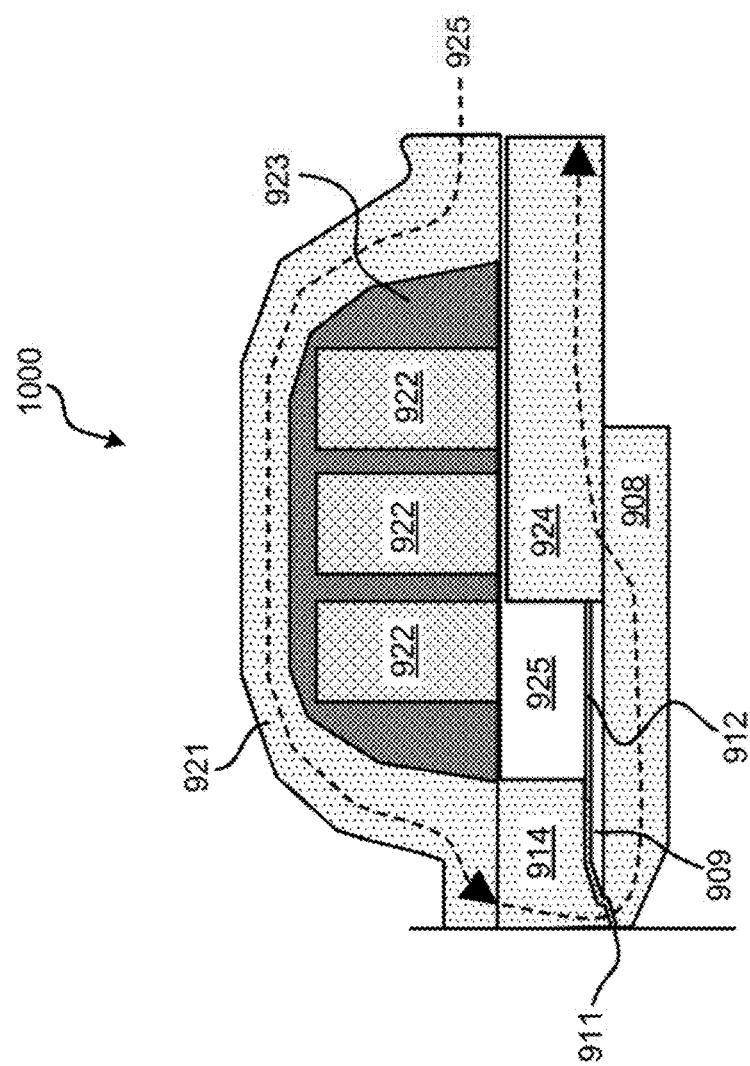
FIG. 10 shows a schematic diagram of a MAMR head according to one embodiment.

FIG. 10 is a cross-sectional view of a MAMR head 1900 in which a coil 922 and a sub-pole 924 are formed on the MAMR head 1000 which has been formed in the manner described above. In the MAMA head 1000, recording information is inducted to an upper pole 921 and the sub-pole 924 as a magnetic field. The induced magnetic flux is applied as a recording field to the medium through the main pole 908 and the trailing shield 914. Furthermore, an oscillation current 925 (oscillation-drive current) which passes from an external electrode through wiring flows successively through: the sub-pole 924—main pole 908—oscillator 911—trailing shield 914—upper pole 921. Here, a gap field between the trailing shield 914 and main pole 908 is applied to the microwave oscillator 911, and a high-frequency magnetic field is generated by the microwave oscillator 911 when the oscillation current 925 causes energizing thereof. The high-frequency magnetic field is applied to a region around the desired recording bit on the magnetic medium for recording data or information thereto, whereby the coercive force of the magnetic medium is effectively lowered, and it is possible to record to a magnetic medium having a greater coercive force even with a small recording field.

Figure 11D:
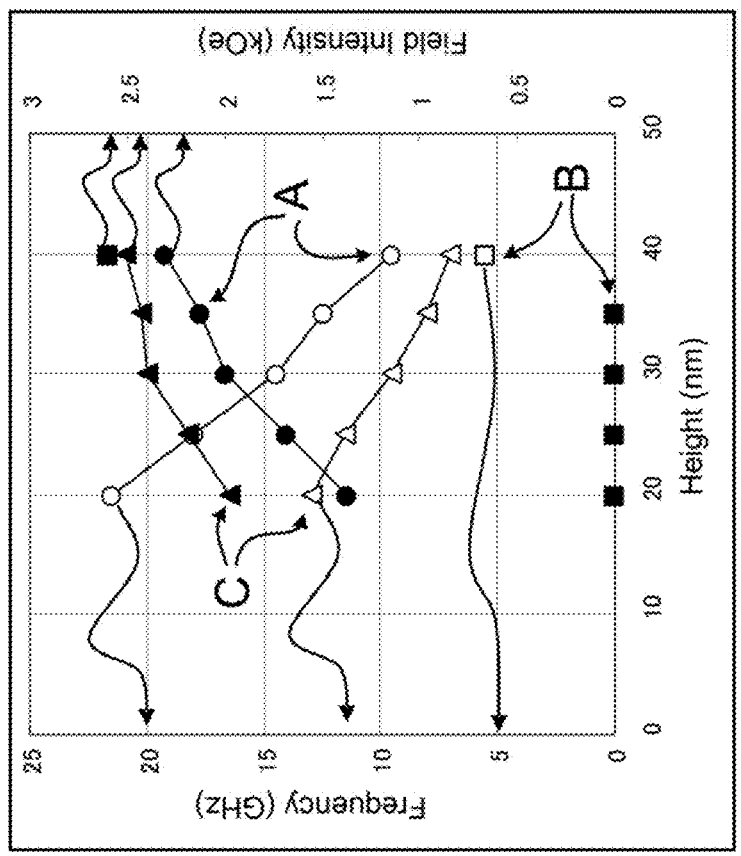
FIGS. 11A-11C show exemplary MAMR structures which produced the oscillation frequency and oscillation field intensity as shown in FIG. 11D.
Figure 11A:
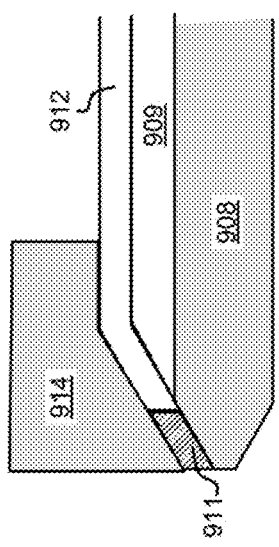
Figure 11B:
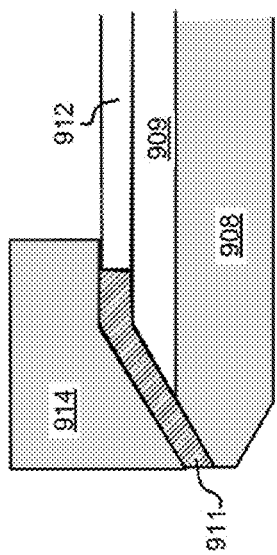
Figure 11C:
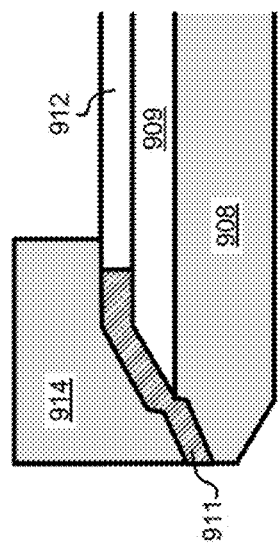

FIG. 11D shows the oscillation frequency and oscillation field intensity of a microwave oscillator having a conventional structure (A), a microwave oscillator formed over the whole surface of the tapered main pole (B), and a microwave oscillator having a structure as described herein according to various embodiments, FIGS. 11A-11C show the cross-sectional shapes of recording heads corresponding to each of microwave oscillators A, B, and C. In the conventional structure of FIG. 11A, the oscillation frequency increases as the height of the oscillator 911 decreases, while the oscillation field intensity decreases at the same time, FIG. 11B shows a structure where the height of the oscillator 911 is increased and the current is confined in accordance with the main pole taper length. In this structure, the height of the microwave oscillator B is the main pole taper length. As is clear from FIG. 11D, when the height is small, there is no oscillation, and therefore the oscillation field intensity is not obtained, but when the height increases, oscillation occurs and the oscillation field intensity is obtained. It is believed that when the height is small, the size of the region which is energized by the current is reduced and the size of the region to be oscillated is reduced, while the region which is not energized by the current does not oscillate, so the region which is energized by the current no longer oscillates either because of the effect of exchange coupling within the film of the oscillator. It is therefore believed that by increasing the height of the oscillator, it is possible to increase the relative size of the region to be oscillated, and oscillation becomes possible. In the case of a structure in which the height of the oscillator is simply increased in this way, oscillation or non-oscillation of the oscillator depends on the magnitude of the distance of the current confinement layer from the ABS. A head which is fitted with an oscillator that does not oscillate is a defective head, and is therefore undesirable.

In FIG. 11C, a structure according to one embodiment is shown, and it is clear that the oscillation frequency and oscillation field intensity are obtained whatever the height, as shown by C in FIG. 11D. Here, the height is the length of the oscillator 911 on the ABS side of the step of the main pole (the region of contact between the main pole 908 and the oscillator 911). As shown in the figure, oscillation occurs at any height. The reason for this is believed to be that the shape magnetic anisotropy due to the step is more intense than the exchange coupling within the film of the oscillator 911, because the step is provided at the boundary between the main pole 908 and the nonmagnetic film 909 in FIG. 11C. With this structure, the oscillation current of the oscillator 911 inwards from the step of the main pole 908 (the region of contact between the nonmagnetic insulating film 909 and the oscillator 911) is reduced because of the current confinement layer 909 and there is no oscillation as a result. However, as shown in FIG. 11A, the oscillation field is obtained at the medium surface, and is therefore adequate for microwave oscillation recording.

It will be understood from the description given above that the embodiments described herein make it possible to provide a structure which oscillates stably without high-precision patterning of the oscillator 911 which is carried out in conventional technology.

Figure 12:
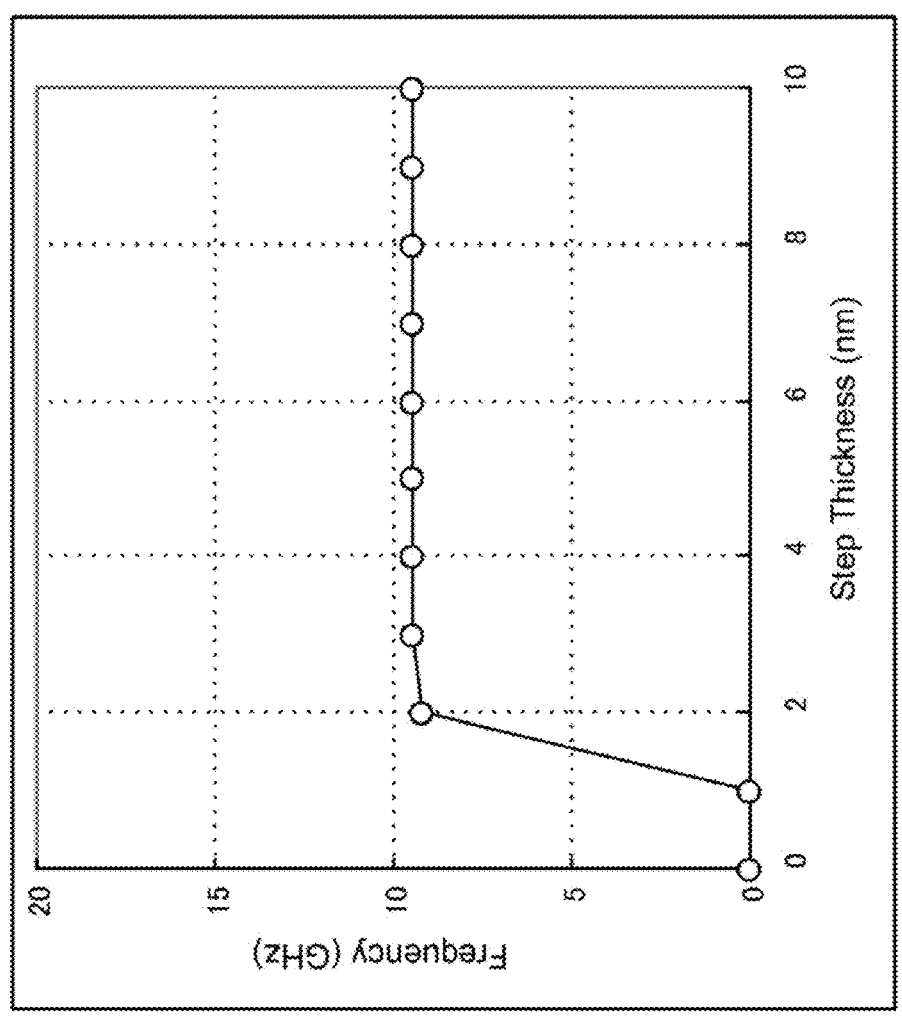
FIG. 12 shows a relationship between the step on the main pole and oscillation frequency, in accordance with one embodiment.

FIG. 12 shows the relationship between the oscillation frequency of the structure according to embodiments described herein and the step on the tapered portion (front portion) of the main pole. Here, the main pole taper length is 30 nm. As is clear from the Figure, a microwave oscillator which does not have a tapered portion does not oscillate. However, when the step on the main pole is increased to about 2 nm or more in this exemplary embodiment, it is clear that stable oscillation is produced. As described above, this is believed to be because the shape magnetic anisotropy caused by the step is greater than the exchange coupling within the oscillator film.

It should be noted that methodology presented herein for at least some of the various embodiments may be implemented, in whole or in part, in computer hardware, software, by hand, using specialty equipment, etc., and combinations thereof.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
   a main pole configured to emit a recording magnetic field for affecting a magnetic medium, the main pole serving as a first electrode and having a front portion at an air bearing surface (ABS) of the magnetic head and a rear portion extending from the front portion in an element height direction perpendicular to the ABS, wherein an upper surface of the main pole has a step transitioning from the front portion to the rear portion;
   a conductive layer positioned above the main pole, the conductive layer serving as a second electrode;
   a microwave oscillator positioned between the main pole and the conductive layer at the ABS of the magnetic head and extending beyond the step in the element height direction; and
   a current confinement layer positioned between the microwave oscillator and the rear portion of the main pole.

2. The magnetic head as recited in claim 1, wherein the microwave oscillator is configured to generate a high-frequency magnetic field which is superimposed with the recording magnetic field in order to record data to the magnetic medium when current flows to the microwave oscillator positioned between the first electrode and the second electrode.

3. The magnetic head as recited in claim 2, wherein the current confinement layer is configured to control a current density distribution of current flowing to the microwave oscillator.

4. The magnetic head as recited in claim 1, wherein the rear portion of the main pole at the step is thicker than the front portion of the main pole at the step.

5. The magnetic head as recited in claim 1, wherein the front portion of the main pole is tapered such that the front portion is thinner at the ABS than at the step.

6. The magnetic head as recited in claim 1, wherein the current confinement layer is not positioned between the microwave oscillator and the front portion of the main pole.

7. The magnetic head as recited in claim 1, wherein a lower surface of the microwave oscillator that contacts the upper surface of the front portion of the main pole are inclined with respect to the element height direction.

8. The magnetic head as recited in claim 7, wherein an upper surface of the current confinement layer is inclined with respect to the element height direction, and wherein an amount of inclination of the current confinement layer is essentially the same as an amount of inclination of the lower surface of the microwave oscillator.

9. The magnetic head as recited in claim 1, wherein the step is at least about 2 nm in thickness.

10. The magnetic head as recited in claim 1, wherein a lower surface of the microwave oscillator has a step positioned at the step of the main pole, and wherein an upper surface of the microwave oscillator has as step positioned closer to the ABS than the step of the lower surface of the microwave oscillator.

11. A magnetic storage device, comprising:
at least one magnetic head as recited in claim 1;
the magnetic medium;
a drive mechanism for passing the magnetic medium over the at least one magnetic head; and
a control controller electrically coupled to the at least one magnetic head for controlling operation of the at least one magnetic head.

12. A method for forming a magnetic head, the method comprising
forming a main pole configured to emit a recording, magnetic field for affecting a magnetic medium, the main pole having a front portion at an air bearing surface (ABS) of the magnetic head and a rear portion extending from the front portion in an element height direction perpendicular to the ABS;
forming a step in an upper surface of the main pole, the step transitioning from the from portion of the main pole to the rear portion of the main pole;
forming a current confinement layer above the rear portion of the main pole;
forming a microwave oscillator above the front portion of the main pole at the ABS of the magnetic head and above the current confinement layer, the microwave oscillator extending beyond the step of the main pole in the element height direction; and
forming a conductive layer above the microwave oscillator, the conductive layer serving as a trailing shield.

13. The method as recited in claim 12, wherein the microwave oscillator is configured to generate a high-frequency magnetic field which is superimposed with the recording magnetic field in order to record data to the magnetic medium when current flows to the microwave oscillator.

14. The method as recited in claim 13, wherein the current confinement layer is configured to control a current density distribution of current flowing to the microwave oscillator.

15. The method as recited in claim 12, wherein the rear portion of the main pole at the step is thicker than the front portion of the main pole at the step.

16. The method as recited in claim 12, wherein the front portion of the main pole is tapered such that the front portion is thinner at the ABS than at the step.

17. The method as recited in claim 12, wherein the current confinement layer is not positioned between the microwave oscillator and the front portion of the main pole.

18. The method as recited in claim 12, wherein a lower surface of the microwave oscillator that contacts the upper surface of the front portion of the main pole are inclined with respect to the element height direction, and wherein an upper surface of the current confinement layer is inclined with respect to the element height direction, and wherein an amount of inclination of the current confinement layer is essentially the same as an amount of inclination of the lower surface of the microwave oscillator.

19. The method as recited in claim 12, wherein the step is at least about 2 nm in thickness.

20. The method as recited in claim 12, wherein a lower surface of the microwave oscillator has a step positioned at the step of the main pole, and wherein an upper surface of the microwave oscillator has a step positioned closer to the ABS than the step of the lower surface of the microwave oscillator.

* * * * *

UNITED STATES PATENT AND TRADEMARK OFFICE
CERTIFICATE OF CORRECTION

PATENT NO. : 8,837,088 B1  
APPLICATION NO. : 14/032157  
DATED : September 16, 2014  
INVENTOR(S) : Kimura et al.

Page 1 of 2

It is certified that error appears in the above-identified patent and that said Letters Patent is hereby corrected as shown below:

Item (57) in the abstract:

In the abstract on the title page, line 12 replace "Magnetic" with -- magnetic --.

In the specification:

col. 1, line 15-16 replace "rize the structure. It should be noted that the region to the left of Aally" with -- The heart of a computer is a magnetic hard disk drive (HDD) which typically --;
col. 2, line 44-45 replace "co rolling" with -- controlling --;
col. 4, line 31 replace "forming," with -- forming --;
col. 4, line 33 replace "recording," with -- recording --;
col. 4, line 33 replace "affecting," with -- affecting --;
col. 4, line 34 replace "having," with -- having --;
col. 4, line 39 replace "forming," with -- forming --;
col. 5, line 1 replace "FIG. 1," with -- FIG. 1 --;
col. 5, line 8 replace "lift, an" with -- lift on --;
col. 5, line 54 replace "is" with -- a --;
col. 5, line 62 replace "magnetic," with -- magnetic --;
col. 6, line 30 replace "not shown)" with -- (not shown) --;
col. 6, line 64 replace "portion contact" with -- portion in contact --;
col. 7, line 26 replace "4A" with -- FIG. 4A --;
col. 7, line 43 replace "affecting," with -- affecting --;
col. 7, line 46 replace "extending," with -- extending --;
col. 7, line 65 replace "art, in" with -- art. In --;
col. 8, line 10 replace "2 nm about" with -- 2 nm and about --;
col. 8, line 25 replace "nonmagnetic" with -- non-magnetic --;
col. 9, line 2 replace "maw" with -- main --;
col. 9, line 17 replace "according," with -- according --;

Signed and Sealed this  
Tenth Day of February, 2015

Michelle K. Lee  
*Deputy Director of the United States Patent and Trademark Office*

CERTIFICATE OF CORRECTION (continued)
U.S. Pat. No. 8,837,088 B1

In the specification:

col. 9, line 26 replace "horn" with -- from --;
col. 9, line 45 replace "oscillator, as" with -- oscillator, and as --;
col. 9, line 57 replace "the pole" with -- the main pole --;
col. 9, line 57 replace "determined," with -- determined --;
col. 10, line 10 replace "generating, a recording," with -- generating a recording --;
col. 10, line 10 replace "also" with -- also, --;
col. 10, line 11 replace "optionally" with -- optionally, --;
col. 10, line 11 replace "taper" with -- taper, --;
col. 10, line 14 replace "prevented," with -- prevented --;
col. 10, line 58 replace "RILE" with -- RIE --;
col. 12, line 21 replace "plating," with -- plating --;
col. 12, line 38 replace "1900" with -- 1000 --;
col. 12, line 41 replace "MAMA" with -- MAMR --.

In the claims:

col. 14, line 65 replace "as" with -- a --;
col. 15, line 6 replace "a control controller" with -- a controller --;
col. 15, line 18 replace "the from portion" with -- the front portion --.